US010119473B2

(12) United States Patent
Lin et al.

(10) Patent No.: US 10,119,473 B2
(45) Date of Patent: Nov. 6, 2018

(54) COMPONENT, GAS TURBINE COMPONENT AND METHOD OF FORMING

(71) Applicant: GENERAL ELECTRIC COMPANY, Schenectady, NY (US)

(72) Inventors: Dechao Lin, Greer, SC (US); Srikanth Chandrudu Kottilingam, Simpsonville, SC (US); Xiaoxue Diao, Greenville, SC (US); Nicholas Thomas, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 507 days.

(21) Appl. No.: 14/717,074

(22) Filed: May 20, 2015

(65) Prior Publication Data
US 2016/0341127 A1 Nov. 24, 2016

(51) Int. Cl.
*F02C 7/22* (2006.01)
(52) U.S. Cl.
CPC .......... *F02C 7/222* (2013.01); *F05D 2230/50* (2013.01); *F05D 2230/90* (2013.01); *F05D 2260/95* (2013.01); *F05D 2300/1723* (2013.01)
(58) Field of Classification Search
CPC ......... F16L 17/04; F16L 9/045; F16L 51/026; F16L 58/14; F16L 9/22; F16L 58/02; F02C 7/222; B29C 66/54; B23K 1/0018; B23K 2201/001
USPC .................................. 138/120, 155–157, 145
See application file for complete search history.

(56) References Cited

U.S. PATENT DOCUMENTS

| 4,413,477 | A | 11/1983 | Dean et al. |
| 4,783,890 | A | 11/1988 | Gaudin |
| 5,630,320 | A | 5/1997 | Matsuda et al. |
| 6,401,320 | B1 * | 6/2002 | Lupke ................ B21C 37/0803 138/157 |

(Continued)

FOREIGN PATENT DOCUMENTS

| EP | 2236793 A1 | 10/2010 |
| WO | 2004033116 A1 | 4/2004 |

OTHER PUBLICATIONS

Bauccio "Metals Reference Book" 1993.*
European Search Report and Opinion, dated Feb. 9, 2017.

*Primary Examiner* — Gerald L Sung
*Assistant Examiner* — William Breazeal
(74) *Attorney, Agent, or Firm* — McNees Wallace & Nurick LLC

(57) ABSTRACT

Components are disclosed which include a first component section and a second component section joined to form a hollow structure defining a plenum having an interior surface, wherein the component sections each include mating ridges joined together along the length of the plenum, and a corrosion-resistant cladding layer including a corrosion-resistant material overlaying the interior surface of the plenum. In one embodiment, the component is a gas turbine combustor fuel manifold. A method of forming the components includes applying corrosion-resistant segments including a corrosion-resistant material to each of the surfaces of the component sections, and joining the component sections to form the component, wherein joining the component sections includes fusing the corrosion-resistant segments into the corrosion-resistant cladding layer, and joining the mating ridges of the component sections.

20 Claims, 3 Drawing Sheets

(56) References Cited

U.S. PATENT DOCUMENTS

| | | | |
|---|---|---|---|
| 6,715,293 B2 | 4/2004 | Sillence et al. | |
| 7,191,750 B2 | 3/2007 | Daly et al. | |
| 8,375,726 B2 | 2/2013 | Wiebe et al. | |
| 8,590,315 B2* | 11/2013 | Overby | F23R 3/002 |
| | | | 60/752 |
| 8,713,944 B2 | 5/2014 | Bleeker | |
| 2002/0148427 A1 | 10/2002 | Jones | |
| 2005/0188699 A1 | 9/2005 | Shafique | |
| 2010/0051726 A1* | 3/2010 | Houtman | F02C 7/222 |
| | | | 239/548 |
| 2013/0199200 A1 | 8/2013 | Hoke et al. | |
| 2013/0232986 A1* | 9/2013 | Stoia | F02C 7/222 |
| | | | 60/776 |
| 2015/0083692 A1* | 3/2015 | Bruck | B23K 26/34 |
| | | | 219/76.14 |
| 2017/0326685 A1* | 11/2017 | Kell | B23K 26/211 |

* cited by examiner

COMPONENT, GAS TURBINE COMPONENT AND METHOD OF FORMING

FIELD OF THE INVENTION

The present invention is directed to components, gas turbine components and a method of forming components and turbine components. More particularly, the present invention is directed to components, gas turbine components and a method of forming the same including a corrosion-resistant cladding layer.

BACKGROUND OF THE INVENTION

Gas turbines are continuously being modified to provide increased efficiency and performance. These modifications include the ability to operate at higher temperatures and under harsher conditions, which often requires material modifications and/or coatings to protect components from such temperatures and conditions. Additionally, under the operating conditions of a gas turbine, fluids present in the gas turbine, such as fuel in the combustor, can be corrosive to the construction materials of the gas turbine.

Surfaces which are subject to corrosion may be clad with corrosion resistant materials to protect the component from damage. However, some components, such as manifolds, which are subject to corrosion and which are contacted by corrosive fluids, such as fuel, are difficult to clad because the surface to be clad is an enclosed and difficult to reach plenum. This difficulty is particularly apparent in the combustor fuel manifold of a gas turbine.

BRIEF DESCRIPTION OF THE INVENTION

In an exemplary embodiment, a component includes a first component section and a second component section joined to form a hollow structure. The hollow structure defines a plenum including an interior surface, a width and a length, the length being greater than the width. The first component section includes a first substrate material and the second component section includes a second substrate material. The first component section also includes a first mating ridge and a second mating ridge, and the second component section also includes a third mating ridge and a fourth mating ridge. The first mating ridge is joined to the third mating ridge along the length of the plenum and the second mating ridge is joined to the fourth mating ridge along the length of the plenum. The component further includes a corrosion-resistant cladding layer including a corrosion-resistant material, wherein the corrosion-resistant cladding layer overlays the interior surface of the plenum.

In another exemplary embodiment, a gas turbine component includes a first component section and a second component section joined to form a combustor fuel manifold. The combustor manifold defines a plenum including an interior surface, a width and a length, the length being greater than the width. The first component section includes a first substrate material and the second component section includes a second substrate material. The first component section also includes a first mating ridge and a second mating ridge, and the second component section also includes a third mating ridge and a fourth mating ridge. The first mating ridge is joined to the third mating ridge along the length of the plenum, and the second mating ridge is joined to the fourth mating ridge along the length of the plenum. The gas turbine component further includes a corrosion-resistant cladding layer including a corrosion-resistant material, wherein the corrosion-resistant cladding layer overlays the interior surface of the plenum.

In another exemplary embodiment, a method of forming a component includes providing a first component section and a second component section. The first component section includes a first substrate material and the second component section includes a second substrate material. The first component section also includes a first mating ridge, a second mating ridge and a first surface between the first mating ridge and the second mating ridge. The second component section also includes a third mating ridge, a fourth mating ridge, and a second surface between the first mating ridge and the second mating ridge. The method of forming a component further includes applying a first corrosion-resistant segment including a corrosion-resistant material to the first surface and a second corrosion-resistant segment including the corrosion-resistant material to the second surface, and joining the first component section and the second component section to form the component. The component defines a plenum including an interior surface, a width and a length, the length being greater than the width. Joining the first component section and the second component section includes fusing the first corrosion-resistant segment and the second corrosion-resistant segment into a corrosion-resistant cladding layer, wherein the corrosion-resistant cladding layer overlays the interior surface of the plenum. Joining the first component section and the second component section further includes joining the first mating ridge to the third mating ridge along the length of the plenum, and joining the second mating ridge to the fourth mating ridge along the length of the plenum.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Wherever possible, the same reference numbers will be used throughout the drawings to represent the same parts.

Provided are exemplary components, turbine components and methods of forming components and turbine components. Embodiments of the present disclosure, in comparison to methods and products not utilizing one or more features disclosed herein, provide a more efficient and cost effective method of cladding the interior surface of a plenum with a corrosion-resistant material, reduce corrosion of the interior surface of a plenum such as a gas turbine manifold, lengthen the service life manifolds contacting corrosive fluids, and reduce repair costs associated with corrosion of manifolds.

Figure 1:
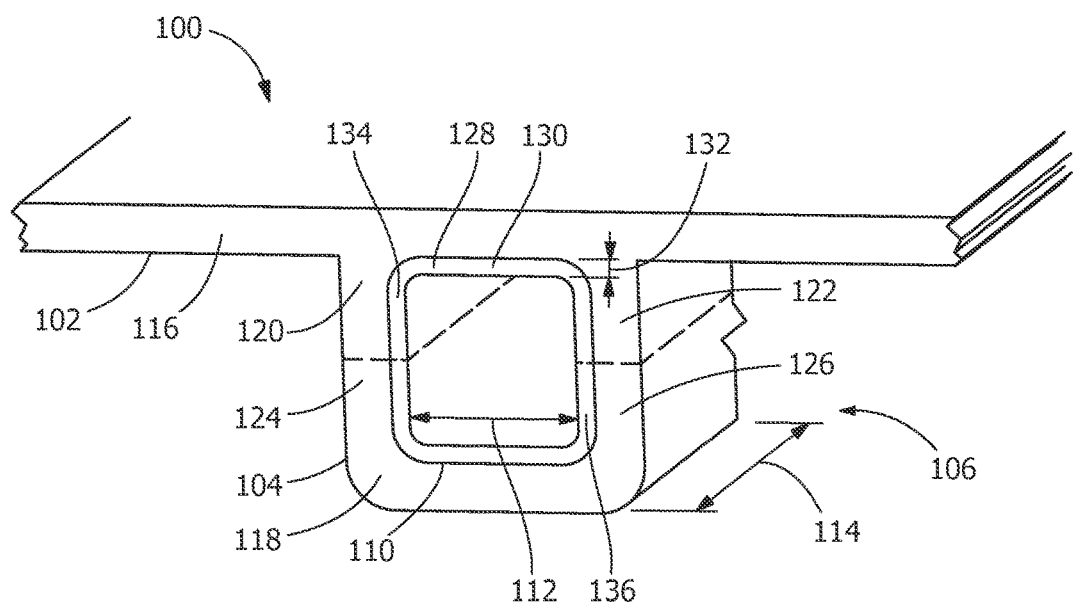
FIG. 1 is a perspective view of a segment of a component, according to an embodiment of the present disclosure.

Referring to FIG. 1, a component 100 includes a first component section 102 and a second component section 104 joined to form a hollow structure 106. The hollow structure 106 defines a plenum 108 including an interior surface 110. The plenum 108 includes a width 112 and a length 114, the length 114 being greater than the width 112. The first component section 102 includes a first substrate material 116 and the second component section 104 includes a second substrate material 118. In one embodiment, the length 114 extends along a circumferential path of the hollow structure 106 (see, e.g. FIG. 6).

The first substrate material 116 and the second substrate material 118 each, independently, is selected from any suitable material, including, but not limited to, steel, carbon steel, low-alloy steel, Cr—Mo steel, and combinations thereof. The first substrate material 116 and the second substrate material 118 may be the same material or may be different materials.

Figure 2:
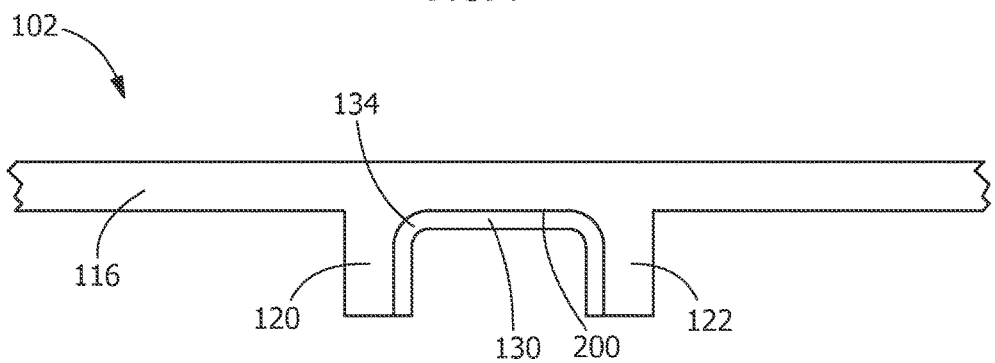
FIG. 2 is a front view of a segment of a first component section prior to joining with the second component of FIG. 3 to form the component of FIG. 1, according to an embodiment of the present disclosure.
Figure 3:
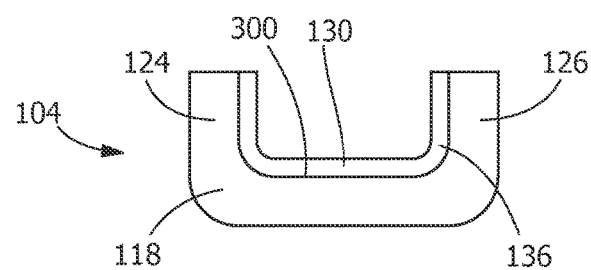
FIG. 3 is a front view of a segment of a second component section prior to joining with the first component of FIG. 2 to form the component of FIG. 1, according to an embodiment of the present disclosure.

Referring to FIGS. 2 and 3, the first component section 102 includes a first mating ridge 120 and a second mating ridge 122, and the second component section 104 includes a third mating ridge 124 and a fourth mating ridge 126.

Referring again to FIG. 1, the first mating ridge 120 is joined to the third mating ridge 124 along the length 114 of the plenum 108 and the second mating ridge 122 is joined to the fourth mating ridge 126 along the length 114 of the plenum 108. A corrosion-resistant cladding layer 128 including a corrosion-resistant material 130 overlays the interior surface 110 of the plenum 108.

The corrosion-resistant material 130 may be any suitable material, including, but not limited to, a nickel-based alloy, a stainless steel, or combinations thereof. In one embodiment, the corrosion-resistant material has a composition, by weight, of about 5% iron, between about 20% and about 23% chromium, up to about 0.5% silicon, between about 8% and about 10% molybdenum, up to about 0.5% manganese, up to about 0.1% carbon, and a balance nickel (available commercially as INCONEL 625—"INCONEL" is a federally registered trademark of alloys produced by Huntington Alloys Corporation, Huntington, W. Va.).

The thickness 132 of the corrosion-resistant cladding layer 128 may be any suitable thickness 132, including, but not limited to a thickness 132 of between about 0.005 inches to about 0.05 inches, alternatively about 0.005 inches to about 0.025 inches, alternatively about 0.025 inches to about 0.05 inches, alternatively about 0.005 inches to about 0.02 inches, alternatively about 0.015 inches to about 0.03 inches, alternatively about 0.025 inches to about 0.04 inches, alternatively about 0.035 inches to about 0.05 inches.

Referring to FIGS. 1, 2 and 3, the corrosion-resistant cladding layer 126 further includes a first corrosion-resistant segment 134 and a second corrosion resistant segment 136, wherein the first corrosion-resistant segment 134 is disposed on a first surface 200 of the first component section 102, and the second corrosion-resistant segment 136 is disposed on a second surface 300 of the second component section 104.

Figure 4:
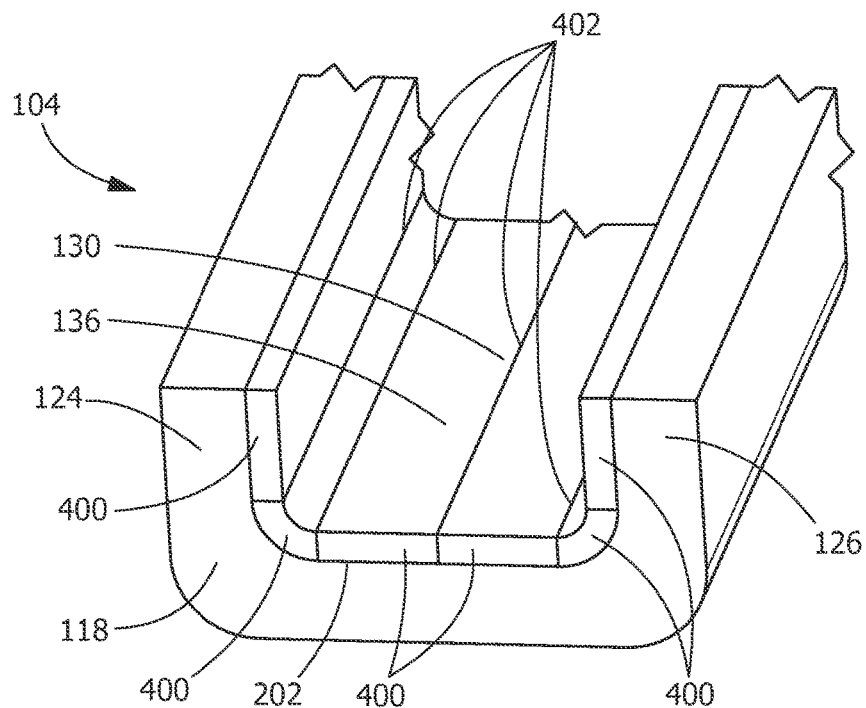
FIG. 4 is a perspective view of a segment of the second component section of FIG. 3, according to an embodiment of the present disclosure.

Referring to FIG. 4, in one embodiment, at least one of the first corrosion-resistant segment 134 (not shown) and the second corrosion resistant segment 136 (shown) includes a plurality of sub-segments 400, wherein of the plurality of sub-segments 400 are joined together at seams 402.

A method of forming the component 100 includes providing the first component section 102 and the second component section 104. The first corrosion-resistant segment 134 is applied to the first surface 200 and the second corrosion-resistant segment 136 is applied to the second surface 300. In one embodiment, applying the first corrosion-resistant segment 134 and the second corrosion-resistant segment 136 includes affixing the first corrosion-resistant segment 134 to the first surface 200 and affixing the second corrosion-resistant segment 136 to the second surface 300. In a further embodiment, at least one of the first corrosion-resistant segment 134 and the second corrosion resistant segment 136 includes a plurality of sub-segments 400, wherein each of the plurality of sub-segments 400 is separately affixed to one of the first surface 200 and the second surface 300. The plurality of sub-segments 400 may be affixed one at a time or affixed in groups of two or more sub-segments 400.

Affixing may include any suitable technique, including, but not limited to welding, brazing, or a combination thereof. Welding may include any suitable welding technique, including, but not limited to, shielded metal arc welding, gas tungsten arc welding, gas metal arc welding, flux-cored arc welding, submerged arc welding, electroslag arc welding, resistance welding, spot welding, seam welding, butt welding, flash welding, projection, welding, upset welding, laser beam welding, electron beam welding, laser-hybrid welding, laser cladding, x-ray welding, ultrasonic welding, explosion welding, friction welding, friction stir welding, magnetic pulse welding, co-extrusion welding, cold welding, diffusion welding, exothermic welding, high frequency welding, hot pressure welding, induction welding, roll welding, and combinations there. Brazing may including any suitable brazing technique, including, but not limited to, torch brazing, furnace brazing, silver brazing, braze welding, vacuum brazing, dip brazing and combinations thereof.

Following affixing the first corrosion-resistant segment 134 to the first surface 200 and affixing the second corrosion-resistant segment 136 to the second surface 300, the first component section 102 is joined to the second component section 104. Joining the first component section 102 to the second component section 104 includes fusing the first corrosion-resistant segment 134 to the second corrosion-resistant segment 136 to form the corrosion-resistant cladding layer 128 which overlays the interior surface 110 of the plenum 108, and joining the first mating ridge 120 to the third mating ridge 124 and the second mating ridge 122 to the fourth mating ridge 126, along the length of the plenum 108.

In one embodiment, fusing the first corrosion-resistant segment 134 to the second corrosion-resistant segment 136 and joining the first mating ridge 120 to the third mating ridge 124 along the length 114 of the plenum 108, and joining the first mating ridge 120 to the third mating ridge 124 and the second mating ridge 122 to the fourth mating ridge 126, along the length of the plenum 108, is accomplished with a single, contemporaneous, joining process. In an alternate embodiment, the first corrosion-resistant segment 134 is fused to the second corrosion-resistant segment 136 with a first joining process, and then the first mating ridge 120 is joined to the third mating ridge 124 and the second mating ridge 122 is joined to the fourth mating ridge 126 with a second joining process, wherein the first joining process and the second joining process may be the same joining process or a different joining process.

A joining process, whether the single, contemporaneous, joining process, the first joining process, the second joining process or an additional joining process, may be any suitable joining process, including, but not limited to a welding process, a brazing process, or a combination thereof. A welding process may include any suitable welding technique, including, but not limited to, shielded metal arc welding, gas tungsten arc welding, gas metal arc welding, flux-cored arc welding, submerged arc welding, electroslag arc welding, resistance welding, spot welding, seam welding, butt welding, flash welding, projection, welding, upset welding, laser beam welding, electron beam welding, laser-hybrid welding, laser cladding, x-ray welding, ultrasonic welding, explosion welding, friction welding, friction stir welding, magnetic pulse welding, co-extrusion welding, cold welding, diffusion welding, exothermic welding, high frequency welding, hot pressure welding, induction welding, roll welding, and combinations there. A brazing process may including any suitable brazing technique, including, but not limited to, torch brazing, furnace brazing, silver brazing, braze welding, vacuum brazing, dip brazing and combinations thereof.

In one embodiment, the first joining process includes an additive root pass to join the first corrosion-resistant segment 134 and the second corrosion-resistant segment 136. As used herein, "additive root pass" indicates a joining technique which deposits a corrosion-resistant material to initiate the joining of the corrosion-resistant material 130 of the first corrosion-resistant segment 134 and the corrosion-resistant material 130 of the second corrosion-resistant segment 136. The corrosion-resistant material deposited by the root pass may be the corrosion-resistant material 130 of the first corrosion-resistant segment 134 and the second corrosion-resistant segment 136 or a different corrosion-resistant material. The additive root pass fuses the first corrosion-resistant segment 134 and the second corrosion-resistant segment 136, forming the corrosion resistant cladding layer 128 and the plenum 108. Following the additive root pass, the first mating ridge 120 is joined to the third mating ridge 124 and the second mating ridge 122 is joined to the fourth mating ridge 126 with a second joining process, forming the component 100. The second joining process and the first joining process may be the same joining process or a different joining process, wherein the second joining process is any suitable joining process for joining the first substrate material 116 and the second substrate material 118.

Figure 5:
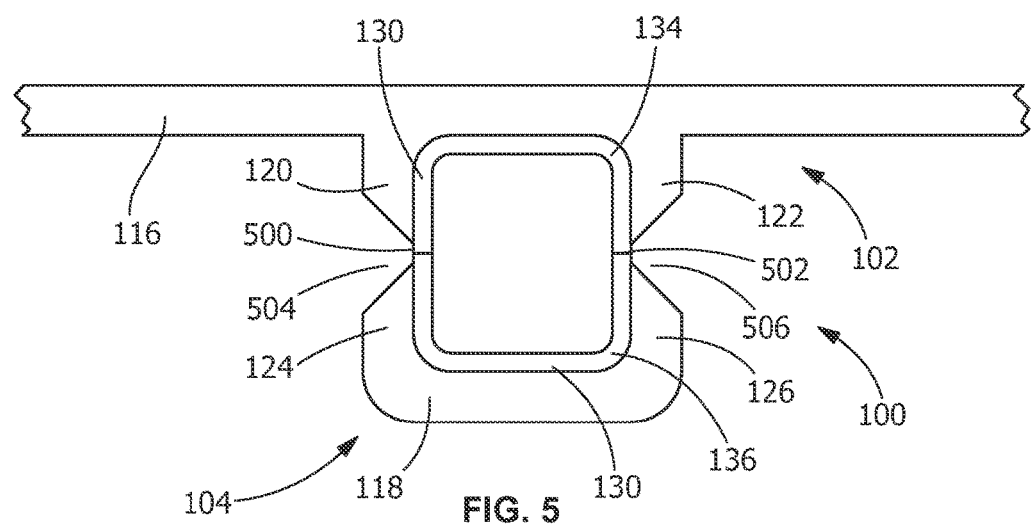
FIG. 5 is a front view of a segment of a first component section and a segment of a second component section during joining to form the component of FIG. 1 prior to an additive root pass, according to an embodiment of the present disclosure.

Referring to FIG. 5, in one embodiment, the first component section 102, the second component section 104, the first corrosion-resistant segment 134 and the second corrosion-resistant segment 136 are configured for an additive root pass. The first corrosion-resistant segment 134 and the second corrosion-resistant segment 136 extend beyond the first component section 102 and the second component section 104, such that when the first component section 102 and the second component section 104 are arranged adjacent to one another for joining, the first corrosion-resistant segment 134 and the second corrosion-resistant segment 136 define a first exposed potion 500 and a second exposed portion 502, and the first component section 102 and the second component section 104 define a first trench 504 and a second trench 506. The additive root pass deposits a corrosion-resistant material on the first exposed potion 500 and the second exposed portion 502.

In a further embodiment, the first mating ridge 120, the second mating ridge 122, the third mating ridge 124 and the fourth mating ridge 126 include any suitable conformations to define the first trench 504 and the second trench 506, including, but not limited to right angles, bevels, chamfers, and combinations thereof. Suitable bevels, chamfers, and combinations thereof include, but are not limited to, straight edges, curved edges, tapered edges, simple edges, complex edges, and combinations thereof. At least one of the first mating ridge 120 and the third mating ridge 124 includes a bevel, chamfer, or a combination thereof, and at least one of the second mating ridge 122 and the fourth mating ridge 126, includes a bevel, chamfer, or a combination thereof.

Including an additive root pass to fuse the first corrosion-resistant segment 134 and the second corrosion-resistant segment 136 prior to joining the first mating ridge 120 to the third mating ridge 124 and the second mating ridge 122 to the fourth mating ridge 126 may increase the corrosion-resisting properties of the corrosion-resistant cladding layer 128 relative a corrosion-resistant cladding layer 126 formed without an additive root pass. Without being bound by theory, it is believed that the additive root pass may reduce or eliminate the potential for a material other than the corrosion-resistant material 130 from intermingling with the corrosion-resistant material 130 in the corrosion-resistant cladding layer 126 and contacting a corrosive fluid in the plenum 108.

Figure 6:
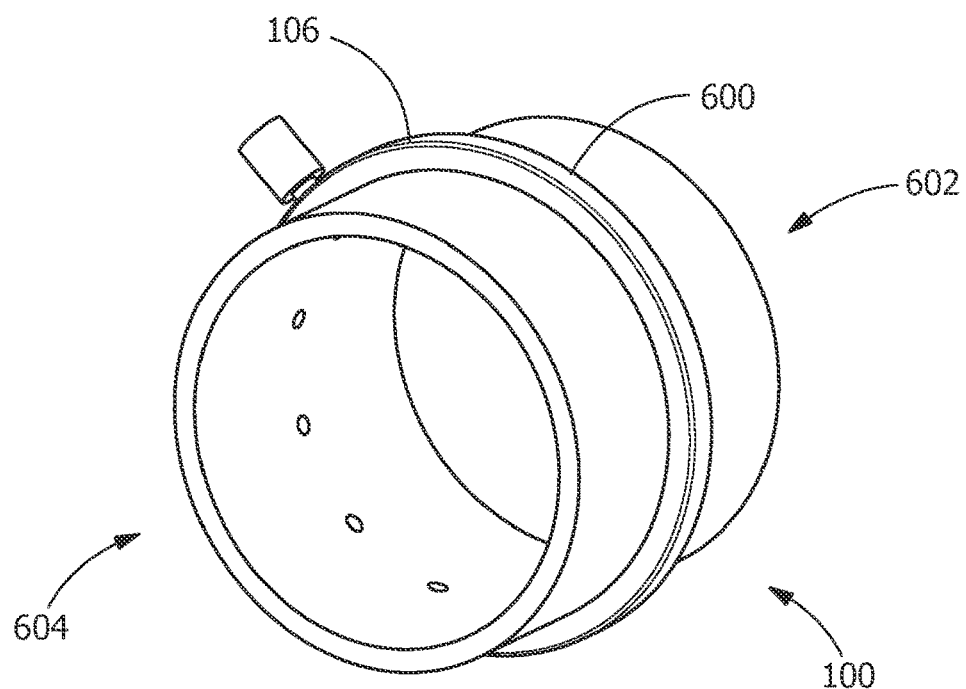
FIG. 6 is a perspective view of a gas turbine combustor fuel manifold, according to an embodiment of the present disclosure.
Figure 7:
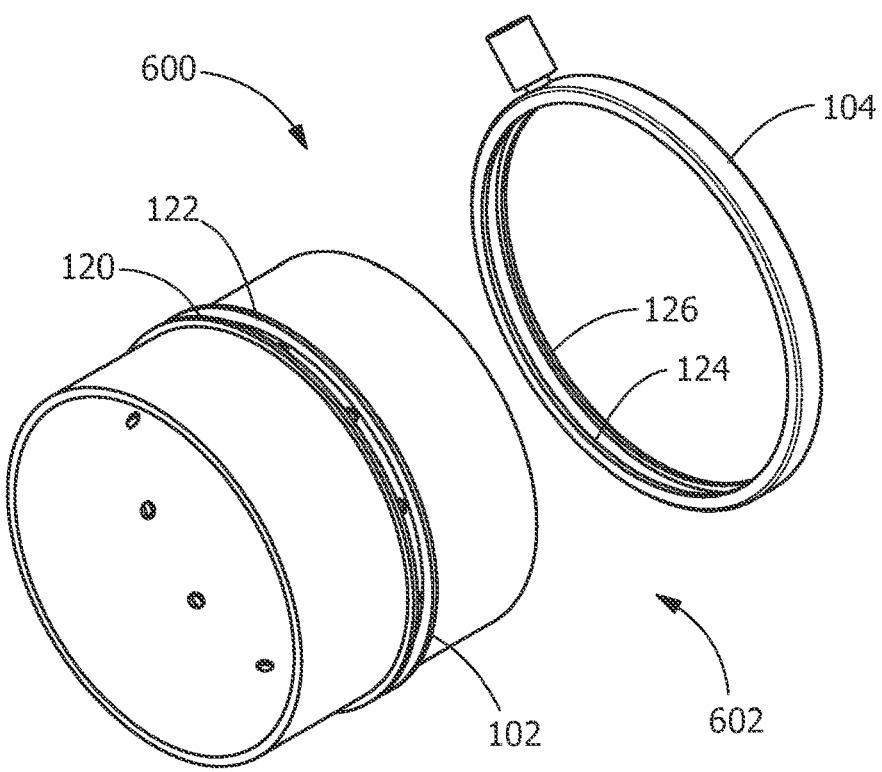
FIG. 7 is an exploded view of the gas turbine combustor fuel manifold of FIG. 1 separating the first component section and the second component section, according to an embodiment of the present disclosure.

Referring to FIGS. 6 and 7, the hollow structure 106 of the component 100 may be a manifold 600. In one embodiment, the component 100 is a gas turbine manifold 602. In a further embodiment, the gas turbine manifold 602 is a combustor fuel manifold 604 (also known as a quat manifold, a combustor quat manifold or a quat fuel manifold). In another embodiment, the gas turbine manifold 600 is a combustor gas manifold (not shown).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A component, comprising:
    a first component section and a second component section joined to form a hollow structure, wherein:
        the hollow structure is an annulus;
        the hollow structure defines a plenum including an interior surface, a width and a length, the length being greater than the width and extending along a circumferential path of the hollow structure;
        the first component section includes a first substrate material and the second component section includes a second substrate material;
        the first component section includes a first mating ridge and a second mating ridge extending radially outward relative to the circumferential path;

the second component section includes a third mating ridge and a fourth mating ridge extending radially inward relative to the circumferential path;

the first mating ridge is joined to the third mating ridge along the length of the plenum; and the second mating ridge is joined to the fourth mating ridge along the length of the plenum; and a corrosion-resistant cladding layer including a corrosion-resistant material, wherein the corrosion-resistant cladding layer overlays the interior surface of the plenum and the corrosion-resistant cladding layer includes a first corrosion-resistant segment overlaying the first component section fused to a second corrosion-resistant segment overlaying the second component section, and wherein the component is a gas turbine component.

2. The component of claim 1, wherein the component is a gas turbine manifold.

3. The component of claim 2, wherein the gas turbine manifold is a combustor fuel manifold or a combustor gas manifold.

4. The component of claim 1, wherein the first substrate material and the second substrate material each, independently, is selected from the group consisting of steel, carbon steel, low-alloy steel, Cr—Mo steel, and combinations thereof.

5. The component of claim 4, wherein the first substrate material and the second substrate material are each independently carbon steel or Cr—Mo steel.

6. The component of claim 1, wherein the corrosion-resistant material is selected from the group consisting of a nickel-based alloy, a stainless steel, or combinations thereof.

7. The component of claim 1, wherein the corrosion-resistant cladding layer includes a thickness of between 0.005 inches to 0.05 inches.

8. A gas turbine component, comprising:

a first component section and a second component section joined to form a combustor fuel manifold, wherein:

the combustor fuel manifold is an annulus;

the combustor fuel manifold defines a plenum including an interior surface, a width and a length, the length being greater than the width and extending along a circumferential path of the combustor fuel manifold;

the first component section includes a first substrate material and the second component section includes a second substrate material;

the first component section includes a first mating ridge and a second mating ridge extending radially outward relative to the circumferential path;

the second component section includes a third mating ridge and a fourth mating ridge extending radially inward relative to the circumferential path;

the first mating ridge is joined to the third mating ridge along the length of the plenum; and the second mating ridge is joined to the fourth mating ridge along the length of the plenum; and a corrosion-resistant cladding layer including a corrosion-resistant material, wherein the corrosion-resistant cladding layer overlays the interior surface of the plenum and the corrosion-resistant cladding layer includes a first corrosion-resistant segment overlaying the first component section fused to a second corrosion-resistant segment overlaying the second component section.

9. The gas turbine component of claim 8, wherein the first substrate material and the second substrate material each, independently, is selected from the group consisting of steel, carbon steel, low-alloy steel, Cr—Mo steel, and combinations thereof.

10. The gas turbine component of claim 8, wherein the corrosion-resistant material is selected from the group consisting of a nickel-based alloy, a stainless steel, or combinations thereof.

11. The gas turbine component of claim 8, wherein the corrosion-resistant cladding layer includes a thickness of between 0.005 inches to 0.05 inches.

12. A method of forming a component, comprising:

providing a first component section and a second component section, wherein:

the first component section includes a first substrate material and the second component section includes a second substrate material;

the first component section includes a first mating ridge, a second mating ridge and a first surface between the first mating ridge and the second mating ridge; and the second component section includes a third mating ridge, a fourth mating ridge, and a second surface between the first mating ridge and the second mating ridge;

applying a first corrosion-resistant segment including a corrosion-resistant material to the first surface and a second corrosion-resistant segment including the corrosion-resistant material to the second surface; and joining the first component section and the second component section to form the component defining a plenum including an interior surface, a width and a length, the length being greater than the width, wherein joining the first component section and the second component section includes:

an additive root pass depositing corrosion-resistant material between the first corrosion-resistant segment and the second corrosion-resistant segment;

fusing the first corrosion-resistant segment and the second corrosion-resistant segment into a corrosion-resistant cladding layer, wherein the corrosion-resistant cladding layer overlays the interior surface of the plenum;

joining the first mating ridge to the third mating ridge along the length of the plenum; and joining the second mating ridge to the fourth mating ridge along the length of the plenum, wherein the component is a gas turbine component.

13. The method of claim 12, wherein the component is a gas turbine manifold.

14. The method of claim 13, wherein the gas turbine manifold is a combustor fuel manifold or a combustor gas manifold.

15. The method of claim 12, wherein the applying the first corrosion-resistant segment and the second corrosion-resistant segment includes affixing the first corrosion-resistant segment to the first surface and affixing the second corrosion-resistant segment to the second surface, wherein affixing includes a technique selected from the group consisting of welding, brazing, or a combination thereof.

16. The method of claim 15, wherein at least one of the first corrosion-resistant segment and the second corrosion resistant segment includes a plurality of sub-segments, each of which plurality of sub-segments is separately affixed to one of the first surface and the second surface.

17. The method of claim 12, wherein joining the first component section and the second component section includes a technique selected from the group consisting of welding, brazing, or a combination thereof.

18. The method of claim 12, wherein the corrosion-resistant material is selected from the group consisting of a nickel-based alloy, a stainless steel, or combinations thereof.

19. The method of claim 12, wherein the first substrate material and the second substrate material each, independently, is selected from the group consisting of steel, carbon steel, low-alloy steel, Cr—Mo steel, and combinations thereof.

20. The method of claim 12, wherein joining the first component section and the second component section forms a hollow structure, and the hollow structure is an annulus.

\* \* \* \* \*